United States Patent [19]

Timineri

[11] Patent Number: 4,691,207
[45] Date of Patent: Sep. 1, 1987

[54] ANTENNA POSITIONING APPARATUS

[75] Inventor: Anthony A. Timineri, Van Nuys, Calif.

[73] Assignee: Nissho Iwai American Corporation, Los Angeles, Calif.

[21] Appl. No.: 646,787

[22] Filed: Sep. 4, 1984

[51] Int. Cl.$^4$ ............................ H01Q 3/08; H01Q 1/12
[52] U.S. Cl. ................................. 343/766; 343/882; 342/359
[58] Field of Search ............... 343/765, 766, 763, 880, 343/882, 7.4, 359, 757; 248/183, 521, 522, 530

[56] References Cited

U.S. PATENT DOCUMENTS

| | | | |
|---|---|---|---|
| 2,642,567 | 6/1953 | Kimball et al. | 343/765 |
| 3,412,404 | 11/1968 | Bergling | 343/765 |
| 3,515,015 | 6/1970 | Gilbert | 343/766 |
| 3,665,482 | 5/1972 | Cresswell | 343/766 |
| 4,126,865 | 11/1978 | Longhurst et al. | 343/766 |
| 4,204,214 | 5/1980 | Fassnacht | 343/766 |
| 4,295,621 | 10/1981 | Siryj | 343/765 |
| 4,475,110 | 10/1984 | Hutchins | 343/766 |

FOREIGN PATENT DOCUMENTS

| | | | |
|---|---|---|---|
| 1064028 | 5/1954 | France | 343/765 |
| 2051484 | 1/1981 | United Kingdom | 343/766 |

Primary Examiner—Eli Lieberman
Assistant Examiner—Michael C. Wimer
Attorney, Agent, or Firm—Harris, Kern, Wallen & Tinsley

[57] ABSTRACT

Apparatus for an earth station antenna is disclosed herein including a parabolic dish antenna pivotally carried on an upper support post mounted for rotation about a vertical axis. Pivotal linkage interconnects the antenna with the upper support post for rotation about a horizontal axis. Power drive is carried in the upper support post for pivoting the antenna about its horizontal axis via the linkage while separate power drive operably couples between the upper support post and a stationary lower post for rotating the upper support post and the antenna about the vertical axis. The lower end of the lower support post is provided with a mounting recess for insertably receiving the terminating end of an upright mounting stanchion.

1 Claim, 3 Drawing Figures

ANTENNA POSITIONING APPARATUS

BACKGROUND OF THE INVENTION

1. Field of the Invention

This invention relates in general, to radiation reflecting and focusing means and more particularly to a novel means for controlling the directivity of an earth station antenna with respect to selective satellites passing overhead.

2. Brief Description of the Prior Art

In the field of far distant satellite tracking, apparatus or mechanisms are required for orienting a device such as a parabolic or dish antenna to face and following a moving or geostationary satellite along its predetermined track or path. This tracking procedure requires that the antenna be movably supported on a fixed base so as to be pivoted about at least two axes. One axis permits the tracking antenna to follow the satellite from an east-to-west path, for example, in the sky while the other axis permits the tracking antenna to follow the satellite in its variations in elevation above the horizon while traversing the east-west path. Many different types of equipment have been developed over the years for accompanying these movements.

However, problems and difficulties have been encountered with prior tracking devices which largely stem from the fact that such devices or systems are complex, bulky and can also be costly. In one instance, push-pull actuators are employed that outwardly extend laterally which limits the articulated movement of the antenna while in another device, a plurality of extendable rods are used in combination to orient the antenna as well as to support the antenna.

Therefore, a long standing need has existed to provide a novel tracking or orientation apparatus for following a satellite that employs an extendible actuator for mounting the antenna via a pivotal linkage whereby the antenna is directed in both azimuth and elevation simultaneously and driven, preferably, on command from a preprogrammed computer control.

SUMMARY OF THE INVENTION

Accordingly, the above problems and difficulties are obviated by the present invention which provides a novel antenna positioning apparatus having an upright support post insertably disposed at its terminating end into a mounting recess located on an intermediate stationary post which in turn, rotably mounts an upper support post or housing. A linkage means pivotally interconnects an antenna with the upper support post and the linkage means includes an extendable actuator arm operated by motor means mounted on the upper support post or housing for orienting the antenna in elevation. Motor means carried on the intermediate post operably couples with the upper support post or housing for driving this antenna in azimuth. The motor means are connected to a central computer system for automatic positioning of the antenna to a geostationary or moving satellite.

Therefore, it is among the primary objects of the present invention to provide a novel antenna positioning apparatus which eliminates most of the conventional used universal joints required to direct or orient an antenna so as to track a selected satellite.

Another object of the present invention is to provide an antenna tracking means that is adjustable over a wide range in azimuth travel and in elevation travel for virtually any desired longitude and latitude location.

Still another object is to provide such an improved apparatus which can be efficiently manufactured and erected at a tracking location. A related object is to provide such and apparatus which minimizes the strength requirements and cost of the mounting pedestal or structure for the apparatus.

Yet another object of the present invention is to provide a novel antenna positioning system that automatically sets azimuth and elevation of an antenna facing a broadcasting satellite.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by references to the following description, taken in connection with the accompanying drawings in which;

DESCRIPTION OF PREFERRED EMBODIMENT

Figure 1:
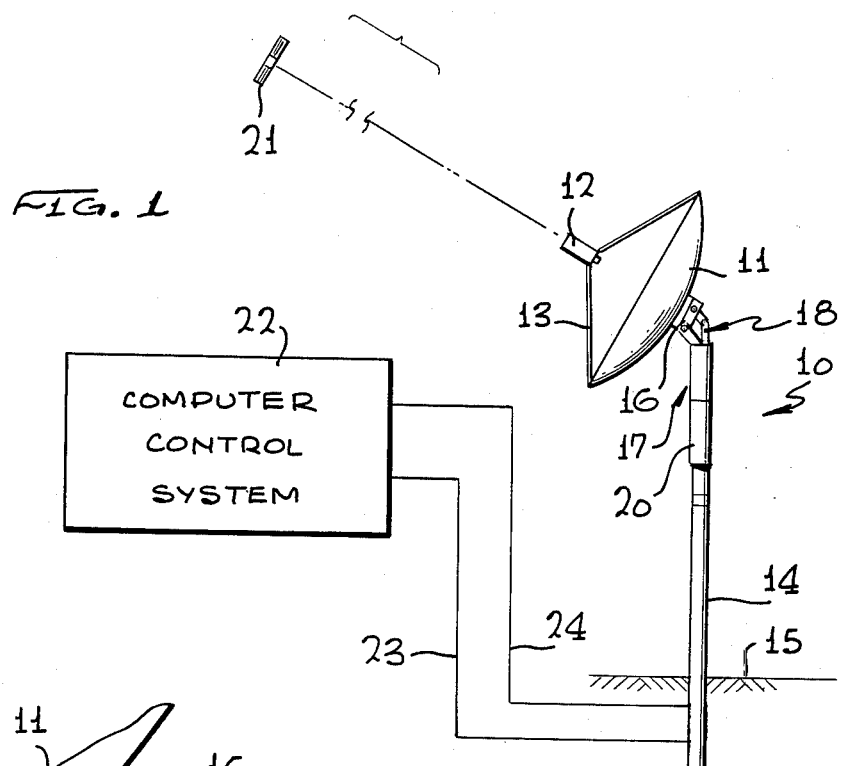
FIG. 1 is a diagrammatic illustration of antenna tracking and positioning apparatus in accordance with the present invention.

Referring to FIG. 1, the novel antenna positioning apparatus of the present invention is illustrated in the general direction of arrow 10 which includes an antenna of the parabolic or dish type 11 having a low noise amplifier 12 carried ahead of the antenna by braces such as brace 13.

A post 14 supports the antenna above a ground location indicated by numeral 15 and at the antenna 11 is support on the post 14 by means of a bracket 16 coupled to a positioning means broadly identified by numeral 17 via a linkage 18. The positioning means 17 is carried on a fixed support 20 that is secured to the terminated end of post 14. It is to be understood that the antenna 11 is positioned in elevation by means of driving the linkage 18 in a manner to move the antenna 11 in a vertical manner so as to locate and track a typical satellite indicated by numberal 21. Horizontal or azimuth movement of the antenna 11 is achieved by rotation of the positioning means 17 which carries the vertical means for driving the linkage 18.

The antenna may be automatically positioned to select and receive transmission from any one of a plurality of satellites by means of a computer control system 22 the control may be remotely located and the system is connected to the antenna components as well as the elevation and azimuth drive means via control cables or line 23 and 24.

Figure 2:
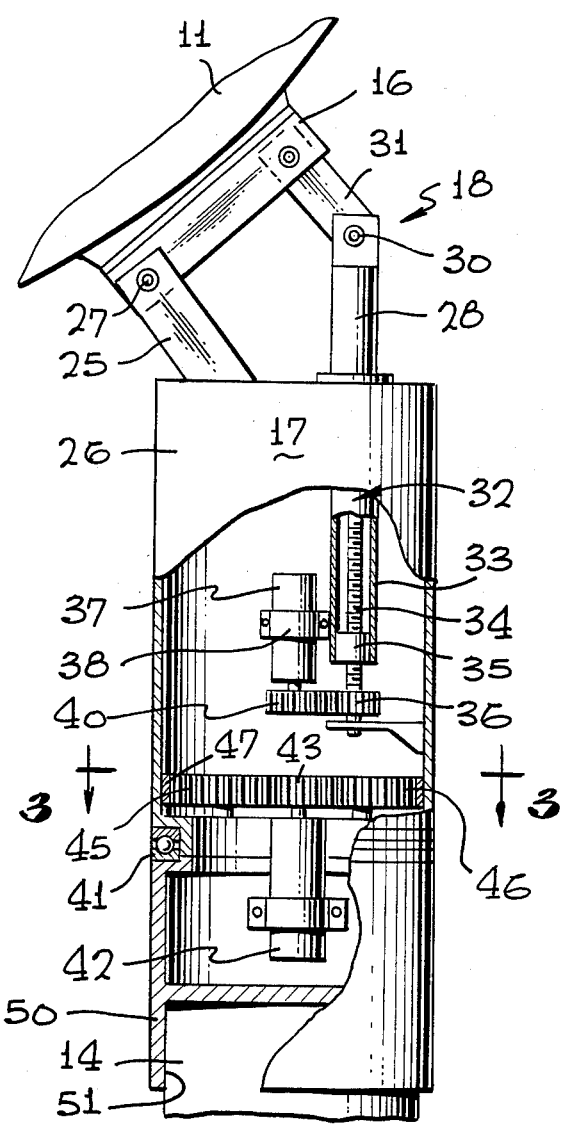
FIG. 2 is an enlarged side elevational view of the apparatus shown in FIG. 1 having portions of the housings broken away to illustrate internal components.

Referring now in detail to FIG. 2, it can be seen that the linkage 18 comprises an angular fixed link 25 which interconnects the top of a housing 26 on the positioning means 17 and which terminates in a pivot 27 connection with antenna bracket 16. An extendible reciprocating rod 28 forms part of a linear piston and cylinder assemblage that is carried on the housing 26. An end portion of the rod 28 outwardly projects from the housing 26 in spaced apart relationship with respect to link 25 and terminate in a pivot 30 connection with a fixed link 31 secured to the end of bracket 16 opposite from its end pivotally to link 25. Therefore, it can be seen that pivots 27 and 30 carry the antenna 11 in an articulated manner such that extension or retraction of the rod 28 to and from the housing 26 will cause the antenna 11 to be elevated or depressed in accordance with movement of the rod 28.

The piston and cylinder assemblage is indicated in general by numberal 32 which includes a housing 33 movably carried to the housing 26 through which the rod or link 28 moves. The rod or link 28 is moved by means of a lead screw 34 in response to driving by means of gears 35 and 36. A motor 37 is fixed to the inside of housing 26 by means of a strap 38 and the motor moves a drive wheel or gear 40 which is in mesh with gear 36. Thusly, a driven gear chain is provied between the drive means or motor 37 and at the rod 28 so that as the gear 36 is rotated, the housing 32 including link or rod 28 will move in a linear manner along the length of the screw 34. In this manner, the antenna is moved in a verticle direction via the linkage 18.

Figure 3:
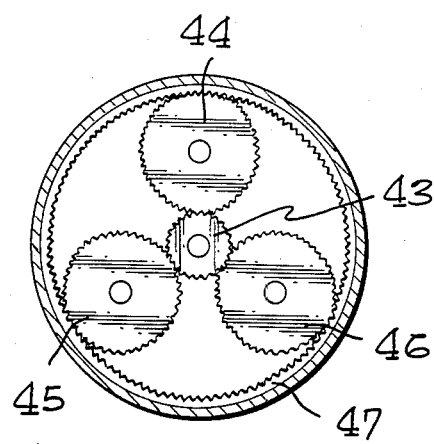
FIG. 3 is a transverse cross sectional view of the apparatus shown in FIG. 2 as taken in the direction of arrows 3—3 thereof.

With respect to azimuth or horizontal rotation, a planetary type drive is provided between the stationary housing 20 and the rotatable housing 26. A suitable bearing means 41 mounts the housing 26 on the end of the stationary housing 20 and a drive means such as motor 42 is fixed to the stationary support 20 along the central vertical axis thereof. The motor drives a pinion gear 43 which is in mesh with idler gears 44, 45 and 46 as shown in FIG. 3. The idler gears drive a ring gear 47 carried on the inner surface of the rotatable housing 26 and transmits a driving force thereto so that the housing, the antenna, the connection linkage 18 and the positioning means 17 are rotated accordingly.

In view of the foregoing, it can be seen that the antenna 11 may be moved in elevation by actuation of the rod or housing 28 in a linear direction and that the rod is moved under power by motor 37 via the drive gear train connected thereto. It can also be seen that rotation of the antenna in a horizontal plane is achieved by powering motor 42 to drive the housing 26 in a rotary manner about the vertical axis of the post 14 and at the housing 20 and 26 via the planetary gear arrangement. The control of motors 37 and 42 is under command of the computer control system 22 so that precise adjustment and articulation of the antenna is produced.

The lower end of stationary housing 20 is provided with an open collar 50 defining a mounting recess 51 for insertably receiving the terminating end of support post 14. Construction in this manner allows for convenient transport of the apparatus and assembly on site. Securement is achieved by welding or other fastening techniques.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a satellite antenna positioning system, the combination which comprises:

an antenna;

an upright post;

movable support means interconnecting said antenna with said upright post for movably supporting said antenna thereon;

said movable support means including a rotary housing carried on said upright post and being coaxially disposed therewith, and a linkage coupling said antenna to said rotary housing;

a first drive motor means including a gear drive train operably connecting said upright post to said rotary housing for driving said housing about a vertical post axis to position said antenna in azimuth;

a second drive motor means having a reciprocating rod interconnecting said rotary housing with said linkage for positioning said antenna in elevation;

a stationary housing fixed to said upright post;

a bearing means disposed between said stationary housing and said rotary housing for movably mounting said rotary housing on said stationary housing;

said stationary housing having an annular collar at the stationary housing end opposite to its end carrying said bearing means, which annular collar defines a mounting recess for insertably receiving said upright post;

said first drive motor means including a planetary gear mechanism carried in said rotary housing and having a ring gear and driving gears in mesh therewith and a drive motor fixed to said stationary housing and coupled to said driving gears in operative relationship for moving said rotary housing; and a computer control means operably coupled to said first and second drive motor means for selectively positioning said antenna in azimuth via said first drive motor means and in elevation via said second drive motor means.

* * * * *